United States Patent Office 3,118,817
Patented Jan. 21, 1964

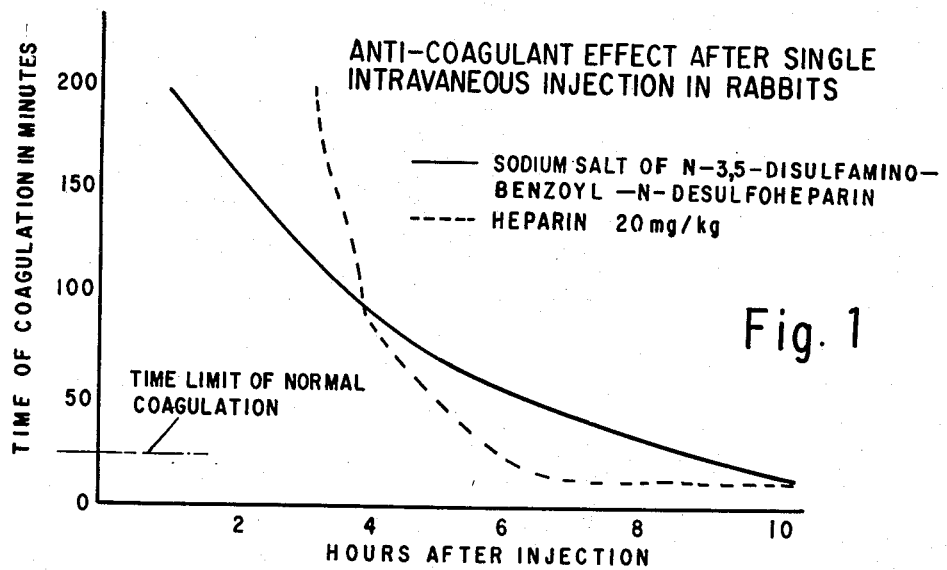
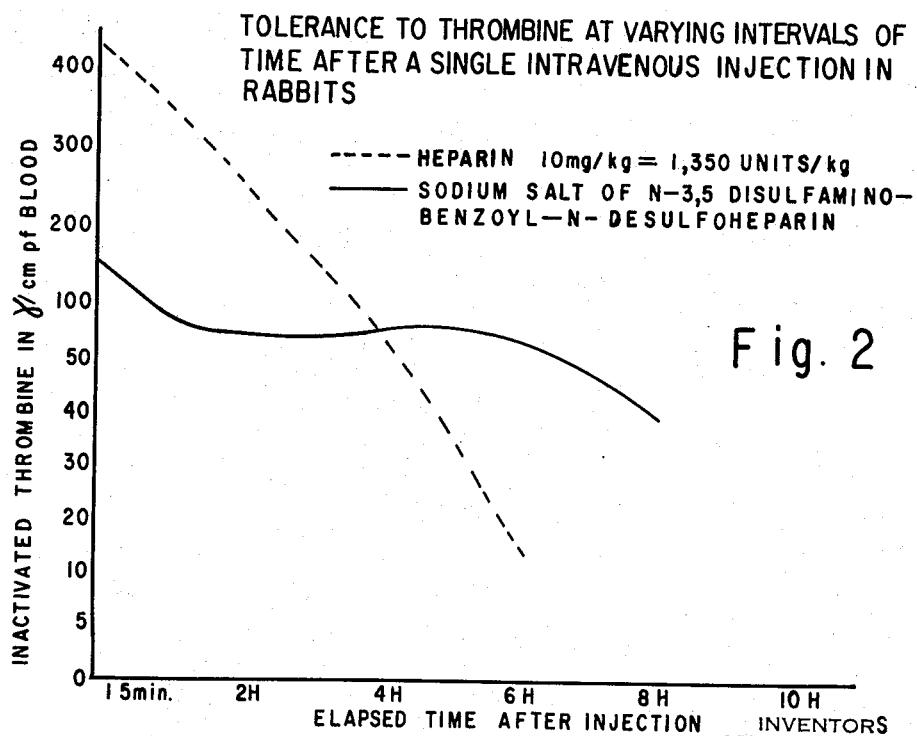

3,118,817
SODIUM SALT OF N-3,5-DISULFAMINO-BENZOYL-N-DESULFOHEPARIN
Gérard Nominé, Nois-le-Sec, and Robert Bucourt, Clichy-sous-Bois, France, assignors to Roussel-UCLAF, SA., Paris, France, a corporation of France
Filed Aug. 27, 1962, Ser. No. 219,680
Claims priority, application France Sept. 7, 1961
4 Claims. (Cl. 167—74)

The invention relates to the novel product, the sodium salt of N-3,5-disulfamino-benzoyl-N-desulfoheparin and to a novel process for its preparation. The invention also relates to novel compositions having a moderate, prolonged blood anticoagulant activity and to a method of preventing the coagulation of blood for prolonged periods of time.

The sodium salt of N-3,5-disulfamino-benzoyl-N-desulfoheparin has interesting pharmacological properties and particularly an immediate and moderate but prolonged anticoagulant activity on blood. It is useful for the preventative or curative treatment of thrombosis, phlebitis, thrombophlebitis, cardiac and circulatory accidents due to disorders of blood coagulation.

It is an object of the invention to provide the novel product, the sodium salt of N-3,5-disulfamino-benzoyl-N-desulfoheparin.

It is another object of the invention to provide a novel process for the preparation of N-3,5-disulfamino-benzoyl-N-desulfoheparin.

It is a further object of the invention to provide novel compositions having an immediate and moderate but prolonged anticoagulant activity on blood.

It is an additional object of the invention to provide a novel method of preventing the coagulation of blood for prolonged periods of time.

These and other objects and advantages of the invention will become obvious from the following detailed description.

The process of the invention for the preparation of the sodium salt of N - 3,5 - disulfamino-benzoyl-N-desulfoheparin comprises reacting the sodium salt of N-3,5-dinitrobenzoyl-N-desulfoheparin with a neutral solution of an alkali metal bisulfite, preferably sodium bisulfite, with heating preferably at reflux temperatures, to form the sodium salt of N - 3,5 - disulfamino-benzoyl-N-desulfoheparin and recovering the latter.

The compositions of the invention having an immediate and moderate, but prolonged blood anticoagulant activity are comprised of the sodium salt of N-3,5-disulfamino-benzoyl-N-desulfoheparin and a pharmaceutical carrier. The compositions may be used in the form of injectable solutions prepared in ampoules, in multiple dose flacons, in the form of tablets, of glossettes, of suppositories and of pomades prepared by the usual known processes.

The method of the invention for preventing the coagulation of blood for prolonged periods of time comprises administering to the patient an effective amount of the sodium salt of N-3,5-disulfamino-benzoyl-N-desulfoheparin. The said sodium salt may be administered orally, transcutaneously, rectally or by application on the skin. The usual useful dose is 50 to 200 mg. and the usual useful daily dose is 50 to 500 mg. depending upon the method of administration.

Referring now to the drawings:

FIG. 1 is a graph comprising the duration of anti-coagulant activity of heparin and N-3,5-disulfamino-benzoyl-N-desulfoheparin by measurement of the time of coagulation.

FIG. 2 is a graph comparing the duration of anticoagulant activity of heparin and N-3,5-disulfamino-benzoyl-N-desulfoheparin by measurement of inactivation of thrombine.

The sodium salt of N-3,5-dinitrobenzoyl-N-desulfoheparin used as the starting material may be prepared according to the process described in the commonly assigned U.S. Patent application Serial No. 824,676, filed July 2, 1959, now U.S. Patent No. 3,065,140. The process comprises reacting acid heparin with a lower alkanol to form an ester of heparin, reacting the latter with sodium hydroxide to obtain heparamine or N-desulfo-heparin, reacting the latter with an acylating derivative of 3,5-dinitrobenzoic acid such as 3,5-dinitrobenzoyl chloride and recovering N-3,5-dinitrobenzoyl-N-desulfoheparin.

In the following example there is described a preferred embodiment to illustrate the invention. However, it should be understood that the invention is not intended to be limited to the specific embodiment.

EXAMPLE

*Preparation of the Sodium Salt of N-3,5-Disulfamino-Benzoyl-N-Desulfoheparin*

21.3 g. of the sodium salt of N-3,5-dinitro-benzoyl-N-desulfoheparin (obtained according to U.S. Patent No. 3,065,140) dissolved in 200 cc. of water were introduced into 1 liter of boiling water. 112.5 cc. of a 35° Bé. solution of sodium bisulfite previously neutralized by the addition of 37.5 cc. of a 9.8 N sodium hydroxide solution were added thereto. The reaction mixture was heated to reflux for a period of one hour. Then a solution of 12.5 g. sodium hydrosulfite, 250 cc. of water and 10 cc. of N sodium hydroxide solution was added and the refluxing was continued for a period of another ten minutes. After cooling, 750 cc. of an aqueous solution containing 10% of hyamine 1622 (see "Index des huiles sulfonées et détergents modernes" of Sisley, vol. II, p. 372) and 100 cc. of an aqueous solution saturated with sodium chloride were added. The mixture was agitated for a period of several minutes and then allowed to stand at room temperature for a period of an hour. The precipitate was vacuum filtered, washed with water and the product obtained was redissolved in 1250 cc. of n-butanol. The solution was extracted successively with 250, 125, 100 and 50 cc. of an aqueous solution containing 20% sodium acetate, in the absence of light. The organic solution was treated with animal black and filtered. 2500 cc. of methanol were added and the precipitated product was was vacuum filtered to obtain 27.3 g. of the raw sodium salt of N-3,5-disulfamino-benzoyl-N-desulfoheparin.

In order to purify the product obtained, it was dissolved in 275 cc. of water. The product was precipitated by the addition of 750 cc. of an aqueous solution containing 10% of hyamine 1622. The precipitate was vacuum filtered, washed with water, and redissolved in 1 liter of n-butanol. The butanolic solution was extracted successively with 200, 100 and 75 cc. of an aqueous solution containing 20% sodium acetate. Thereafter the organic phase was treated with animal black, filtered, and precipitated with 2 liters of methanol. The precipitate was vacuum filtered, washed with methanol, dried, and 22.7 g. of the dried product N-3,5-disulfamino-benzoyl-N-desulfoheparin, were obtained whose analysis presents the following characteristics: S, 14.55%; $NH_2$, 0.2%; $NO_2$, none. Anticoagulant activity: 21 U.S.P. units/mg.

The above product was dissolved in 230 cc. of apyrogenic water, treated with animal black and filtered. The filter cake was washed with 100 cc. of apyrogenic water and combined with the previous filtrate. 70 g. of sodium acetate containing 3 mols of water were added to the filtrate and a precipitation was caused by the addition of 1750 cc. of methanol. The precipitate was vacuum filtered, washed with methanol, then with ether, dried, and 18.25 g. of the dried product, N-3,5-disulfamino-benzoyl-N-desulfoheparin, were obtained (being an over-all yield of 85.2%) containing less than 0.3% of free amine expressed as diamino benzoic acid, and less than 1.5% of N-3,5-dinitro-benzoyl-N-desulfoheparin. S, 14.6%. Anticoagulant activity: in vivo, 18 u./mg.; in vitro, 20 u. U.S.P./mg.

The sodium salt of N-3,5-disulfamino-benzoyl-N-desulfoheparin occurred in the form of an amorphous solid of beige or cream color, solvated with 10% of water. The compound was soluble in 5 volumes of water, insoluble in alcohol, ether, acetone, benzene and chloroform.

All the purification operations were conducted in the absence of light.

The compound obtained is not described in the literature.

PHARMACOLOGICAL TESTS

A. Determination of the Immediate Anticoagulant Effect

The immediate anticoagulant effect was evaluated by comparison with a standard heparine as control. Three different doses of N-3,5-disulfamino-benzoyl-N-desulfoheparin and of heparin were administered intravenously to rabbits. Blood from a marginal vein of the ear was taken exactly five minutes after the injection and the time for coagulation was determined by the technique in the tube. The doses which increase by five times the time of normal coagulation were established graphically and the activity was calculated in units per mg. of the compound studied with reference to the standard heparine.

It was noted that the curves of activity of the sodium salt of N-3,5-disulfamino-benzoyl-N-desulfoheparin were noticeably parallel to those of heparin. Consequently, a valid comparison between these two compounds could be made.

For the sodium salt of N-3,5-disulfamino-benzoyl-N-desulfoheparin, the average of five tests gave an activity of 22 units per mg. whereas that of heparin is of the order of 135 unts per mg.

B. Determination of the Delayed Anticoagulant Activity

1. BY MEASURE OF THE TIME OF COAGULATION

In order to determine this activity, the technique described above with the measurement of the time of coagulation 2, 4, 6, 8 and 10 hours after the injection into rabbits in a single intravenous dose was used. The results of a typical test are found in the graph of FIG. 1.

It was noted that despite the difference between the number of anticoagulant units contained in the doses injected (20 mg. corresponding in effect to 2700 U.S.P. units of heparin and to 400 U.S.P. units of N-3,5-disulfaminobenzoyl-N-desulfoheparin) the action of N-3,5-disulfaminobenzoyl-N-desulfoheparin became, starting from the fifth hour, superior to that of heparin and this activity was maintained for a period of 9 to 10 hours, whereas the activity of heparin disappeared in 6 to 7 hours.

The following table gives the results obtained after effecting many tests:

| Product | Dose | Duration of Action, Hours |
| --- | --- | --- |
| Heparin | 10 mg./kg. or 1,350 U.S.P. Units. | 3–4 |
| Sodium salt of N-3,5-disulfamino-benzoyl-N-desulfoheparin. | 10 mg./kg. or 200 U.S.P. Units. | 6–7 |
| Heparin | 20 mg./kg. or 2,700 U.S.P. Units. | 6–7 |
| Sodium salt of N-3,5-disulfamino-benzoyl-N-desulfoheparin. | 20 mg./kg. or 400 U.S.P. Units. | 9–10 |

2. BY MEASUREMENT OF THE TOLERANCE TO THROMBINE

Doses of 10 mg./kg. of the sodium salt of N-3,5-disulfamino-benzoyl-N-desulfoheparin and of heparin were injected in rabbits intravenously in single doses. The blood was taken 15 minutes, 2, 4, 6 and 8 hours after injection. On each sample, the time of coagulation was determined at 37° C.: (1) in the presence of physiologic serum and (2) in the presence of increasing amounts of thrombine. The thrombine shortened the time of coagulation of the normal blood starting at doses of 2.5 to 5γ per cc. of blood.

The samples of blood taken after injection of heparin and of the novel product required evidently more elevated amounts of thrombine. The dose of thrombine which brings the time of coagulation to 200 seconds is considered as the amount of thrombine inactivated by heparin and the novel anticoagulant compound as found in the blood. The graph of FIG. 2 shows the results of this test and this dose of thrombine is shown as the ordinate (logarithmic scale).

It can be seen from the graph that while the immediate anticoagulant effect of the sodium salt of N-3,5-disulfamino-benzoyl-N-desulfoheparin was clearly weaker than that of heparine, its activity curve which comprise a plateau crossed the curve of heparine at the fourth hour. The activity of this compound is thus superior to that of heparin at this time and is maintained for eight hours after the injection.

3. DETERMINATION OF THE TOXICITY

The test of acute toxicity was effected on mice of the Rockland strain weighing between 18 and 22 g. The sodium salt of N-3,5-disulfamino-benzoyl - N - desulfoheparin was placed in solution in physiologic serum at a concentration of 20 mg./cc. It was injected by intravenous methods at doses of 100 and 200 mg./kg. The animals were held under observation for a period of one week. No sign of intoxication or mortality was noted. Only traces of bleeding at the place where the injection had been made were noted. The sodium salt of N-3,5-disulfamino-benzoyl-N-desulfoheparin is thus not toxic at doses of 100 and 200 mg./kg.

Various modifications of the process and compositions of the invention may be made without departing from the spirit on scope thereof and it is to be understood that the invention is to be limited only as defined in the appended claims.

We claim:

1. The sodium salt of N-3,5-disulfamino-benzoyl-N-desulfoheparin.

2. A composition having a moderate, prolonged blood anticoagulant activity which comprises the sodium salt of N-3,5-disulfamino-benzoyl-N-desulfoheparin and a pharmaceutical carrier.

3. A process for the preparation of the sodium salt of N-3,5-disulfamino-benzoyl-N-desulfoheparin which comprises reacting N-3,5-dinitrobenzoyl - N - desulfoheparin with an alkali metal bisulfite with heating to form the sodium salt of N-3,5-disulfamino-benzoyl-N-desulfoheparin and recovering the latter.

4. The process of claim 3 wherein the alkali metal bisulfite is sodium bisulfite.

References Cited in the file of this patent

UNITED STATES PATENTS 3,065,140    Velluz _____ Nov. 20, 1962